C. T. CUTLIP.
SPRING STRUCTURE.
APPLICATION FILED OCT. 5, 1914.
1,159,477.
Patented Nov. 9, 1915.
3 SHEETS—SHEET 1.
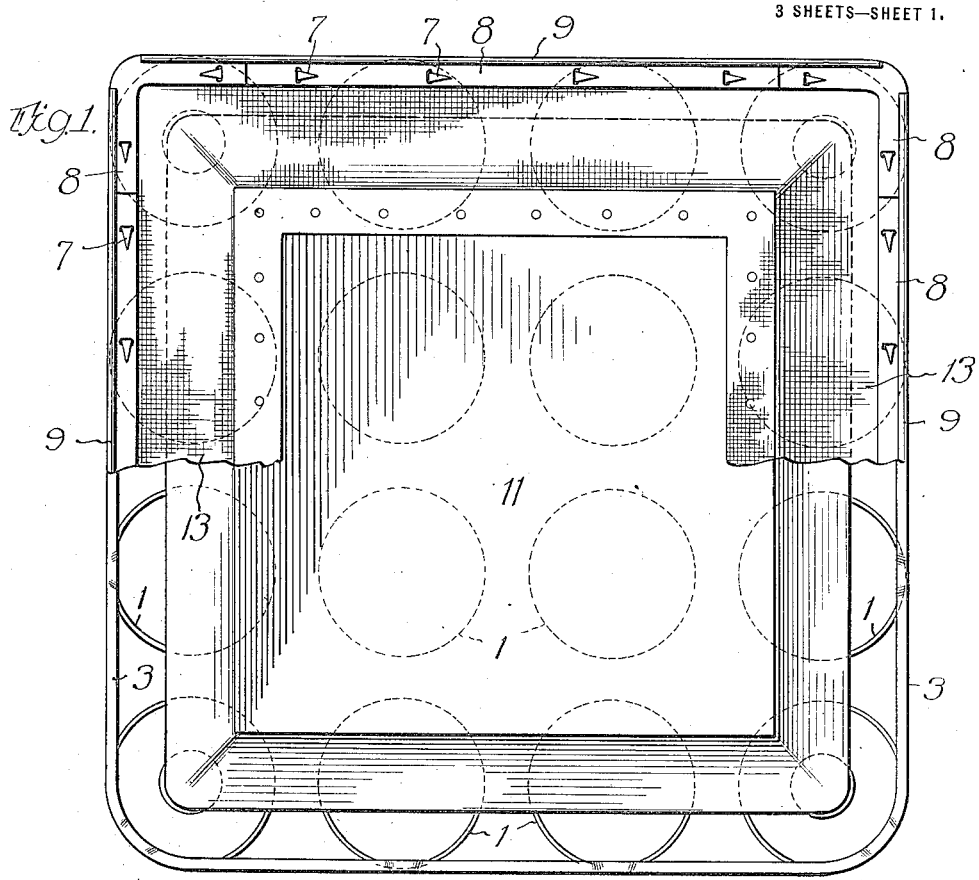
Fig. 1.
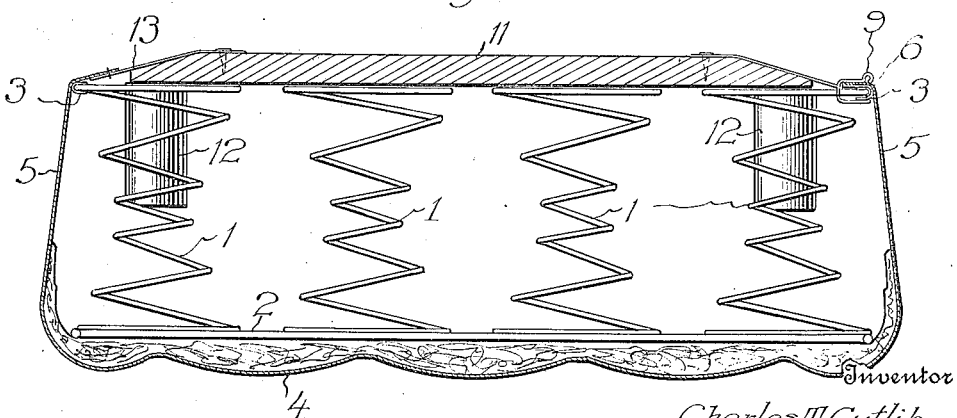
Fig. 2.
Witnesses
Arthur F. Draper.
Anna M. Dorr.
Inventor
Charles T. Cutlip
By
Attorneys

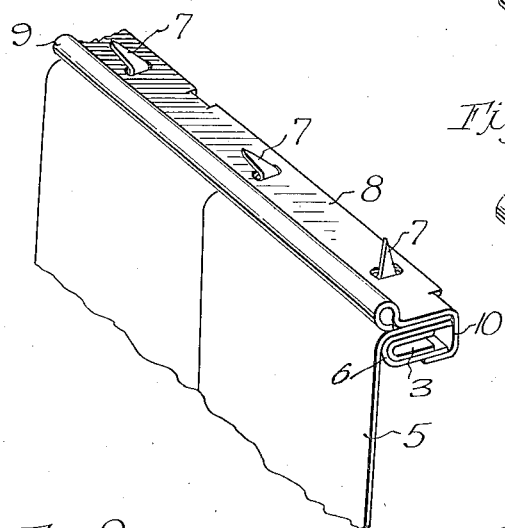
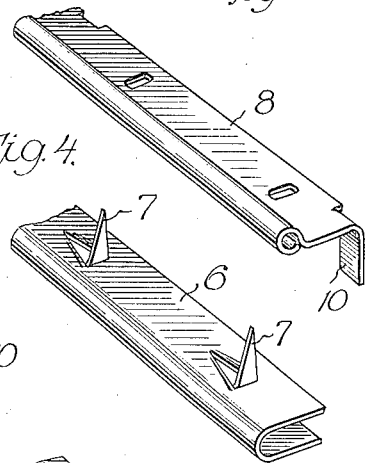
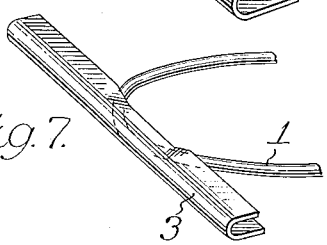
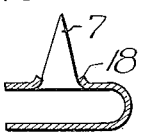
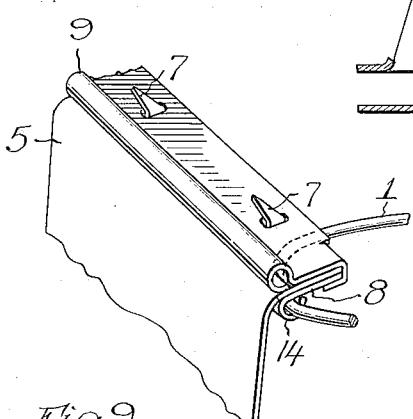
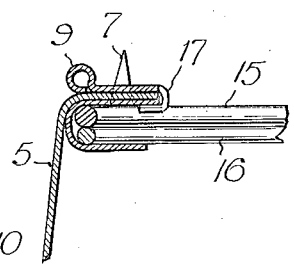
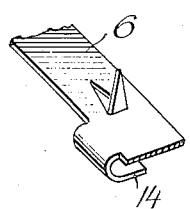
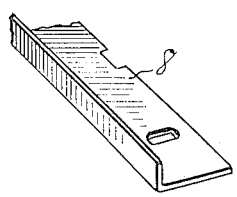

C. T. CUTLIP.
SPRING STRUCTURE.
APPLICATION FILED OCT. 5, 1914.
1,159,477.
Patented Nov. 9, 1915.
3 SHEETS—SHEET 3.
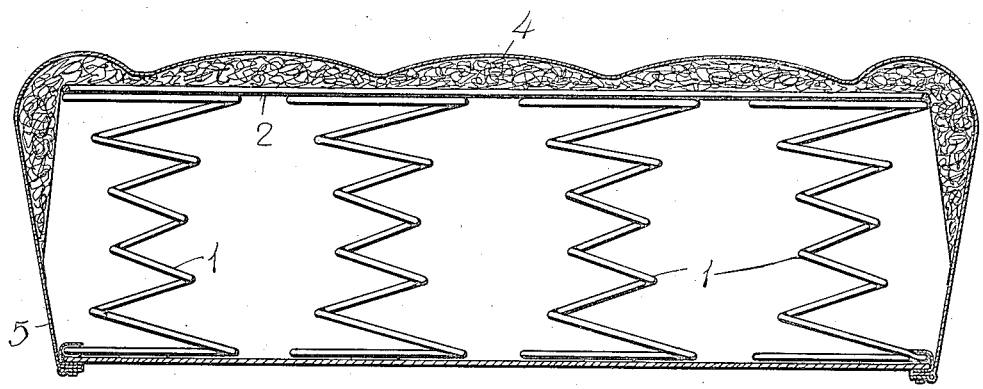
Fig. 12.
Witnesses
Arthur F. Draper
Anna M. Dorr
Inventor
Charles T. Cutlip
By 
Attorneys

UNITED STATES PATENT OFFICE.

CHARLES T. CUTLIP, OF DETROIT, MICHIGAN.

SPRING STRUCTURE.

1,159,477.  Specification of Letters Patent.  Patented Nov. 9, 1915.

Application filed October 5, 1914. Serial No. 864,991.

*To all whom it may concern:*

Be it known that I, CHARLES T. CUTLIP, a citizen of the United States of America, residing at Detroit, in the county of Wayne and State of Michigan, have invented certain new and useful Improvements in Spring Structures, of which the following is a specification, reference being had therein to the accompanying drawings.

This invention relates to upholstery spring construction and to a method of applying the upholstery covering thereto and to an arrangement of parts whereby the depending apron of the upholstery is held smoothly in position during the process of application and is fastened by means which give a smooth finish to the structure and obviate the use of upholstery tacks, stitching or the like.

The invention is particularly adaptable for use with spring constructions having a wire or metal rim frame.

The invention consists in the matters hereinafter set forth and more particularly pointed out in the appended claims.

In the drawings, Figure 1 is a view of the underside of a structure that embodies features of the invention, partially broken away and arranged to show the method of application; Fig. 2 is a view in transverse section of the structure; Fig. 3 is a view in detail showing a form of fastening strip applied to a rim frame; Fig. 4 is a view in detail of one form of holding member; Fig. 5 is a view in detail of a companion clamping strip; Fig. 6 is a view in detail of a holding member showing a preferred construction thereof; Fig. 7 is a view in detail of one form of spring holding rim frame member; Fig. 8 is a view in detail showing the application of a clamping strip and holding member to a spring structure so as to form the rim frame thereof; Figs. 9 and 10 are views in detail of the modifications of the holding and clamping strips; Fig. 11 is a view in detail of a modified form of clip that may be used; and Fig. 12 is a view in transverse section of a completed structure.

Referring to the drawings a structure having upright body springs 1 of conventional or standard type that support an upper frame 2 is provided with a lower rim frame 3 which as herein indicated may be of a U-shaped strip between whose flanges the lower turns of the body springs are gripped. Seat upholstery 4 rests on the upper rim frame 2 and a cover thereof depends in the usual manner to form an apron 5.

The lower margin of the apron is drawn smoothly over a holding strip 6 that in the preferred form is U-shaped and is arranged to smoothly enfold and grip the base frame side and end members. Spurs 7 are struck up at intervals from the body of the upper flange of this strip to register and pass through openings in a companion clamping strip 8, the spurs piercing the fabric of the cover 5 and retaining the clamping strip by being headed down upon the latter. As a preferred construction the margin of the clamping strip may have a wire or false wire edge 9 and also inner lugs 10 that are bendable around the strip 6 and the applied frame to hold the parts securely in position.

In order to smoothly draw the apron 5 into position a contacting frame 11 of suitable material is placed on the bottom of the structure where it is held in proper position by depending dowel pins 12 that engage the corner springs or other suitable parts of the structure. A strip 13 of suitable fabric such as burlap, canvas or the like is stitched to the margin of the apron and the latter is drawn to place, the strip 13 being tacked to the frame 11 as indicated in Figs. 1 and 2. This forces the apron over and holds it securely on the member 6 while the clamping strip 8 is being applied, the temporary strip 13 being then ripped off and the temporary frame removed.

If desired the strip 6 may be flat as indicated at 8 in Fig. 8 with ears 14 or the like arranged to hold the body springs. Or as indicated in Fig. 11, the strip 6 may inclose a rim wire 15 and the base turn 16 of the body springs with a suitable clip 17 applied thereto.

As indicated in Figs. 9 and 10 the form and proportions of the strips 6 and 8 may be varied. As a further detail of good construction it is advisable that the margins 18 formed around the openings from which the tongues 7 turn up be slightly upbent to form a bearing which gives a good seat to the clamping strip 8 and insures its pinching down properly upon the interposed fabric of the apron. If the edge of the strip 8 be rolled as indicated in Figs. 3 and 8, the resultant margin is liable to project beyond the plane of the face of the strip adjacent the apron and in such instance the shoulders 18 insure proper hold upon the apron.

As a result of this construction upholstery may be applied very rapidly to a seat structure without the use of tacks or lines of stitching. The structure gives the finish to the base and reinforces the same. As indicated in Fig. 12, the construction lends itself readily to holding a sheet of suitable material that prevents the entrance of dust into the structure.

Obviously, changes in the details of construction may be made without departing from the spirit of my invention and I do not care to limit myself to any particular form or arrangement of parts.

What I claim is:—

1. A method of applying upholstery to a spring structure having a base frame consisting in applying a temporary upholstery strip to an upholstery apron, in tacking the same to the false frame applied to the base of the structure whereby the apron is drawn smoothly over the main base frame and in clamping the apron to the base frame by metal members that are held together by prongs which pierce the apron, the temporary tacking strip and frame being then removed.

2. The method of applying upholstery to a spring seat structure having a base frame which consists in drawing the marginal portions of the upholstery apron smoothly over the frame and securing them temporarily, in applying clamping strips to the apron and frame which have holding members that pierce the fabric of the apron and in clenching down the latter members.

3. An upholstery spring construction comprising a base, body springs on the base, upholstery supported on the springs and provided with a depending apron, a U-shaped holding strip embracing the base and with the margins thereof turned inwardly, an apertured clamping strip, spurs on the upper flange of the holding strip extending through the fabric of the apron which is placed between the holding and clamping strip and through the apertures of the clamping strip and bent downwardly upon the latter, and a wire edge on the outer margins of the clamping strip forming a support for the base below the plane of the spurs, portions of the other margin of the clamping strip being bent over the adjacent margins of the U-shaped strip to secure the parts together.

In testimony whereof I affix my signature in presence of two witnesses.

CHARLES T. CUTLIP.

Witnesses:
 ANNA M. DORR,
 CHAS. W. STAUFFIGER.